US012580835B2

(12) United States Patent
Bhat et al.

(10) Patent No.: US 12,580,835 B2
(45) Date of Patent: Mar. 17, 2026

(54) TUNNELED COMMUNICATION MONITORING

(71) Applicant: Microsoft Technology Licensing, LLC, Redmond, WA (US)

(72) Inventors: Nikish Bhat, Bellevue, WA (US); Jamie Dorea Gaudette, Kirkland, WA (US); Pankaj Garg, Union City, CA (US); Somesh Chaturmohta, Bellevue, WA (US); Suji Panicker Raja Mohan, Duluth, GA (US); Mu Zhang, Belmont, MA (US); Gary Steven Bolivar, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 18/163,646

(22) Filed: Feb. 2, 2023

(65) Prior Publication Data

US 2024/0267310 A1 Aug. 8, 2024

(51) Int. Cl.
*H04L 43/0829* (2022.01)
*H04L 43/12* (2022.01)

(52) U.S. Cl.
CPC .......... *H04L 43/0829* (2013.01); *H04L 43/12* (2013.01)

(58) Field of Classification Search
CPC ...... H04L 43/0829; H04L 43/12; H04L 43/10
See application file for complete search history.

(56) References Cited

U.S. PATENT DOCUMENTS

| | | | | |
|---|---|---|---|---|
| 11,115,309 B1 * | 9/2021 | Scholl | ..................... | H04L 43/12 |
| 11,153,190 B1 * | 10/2021 | Mahajan | .............. | H04L 67/148 |
| 11,245,627 B2 | 2/2022 | Zhang | | |
| 11,546,240 B2 | 1/2023 | Voderbet | | |
| 2022/0070146 A1 * | 3/2022 | Gerstel | .............. | H04L 12/2854 |
| 2022/0210040 A1 * | 6/2022 | Chen | ....................... | H04L 45/64 |
| 2023/0188450 A1 * | 6/2023 | Kotalwar | ............... | H04L 43/20 709/224 |
| 2023/0216772 A1 * | 7/2023 | Veyland | ................. | H04L 43/12 709/224 |
| 2023/0421478 A1 * | 12/2023 | Chhabra | ............. | H04L 63/0272 |

(Continued)

FOREIGN PATENT DOCUMENTS

WO        2016184245 A1    11/2016

OTHER PUBLICATIONS

"VxLan Monitoring Overview", 6 Pages.

(Continued)

*Primary Examiner* — Schquita D Goodwin
(74) *Attorney, Agent, or Firm* — Holzer Patel Drennan

(57) ABSTRACT

A system generates a probe packet including a probe flag and transmits the probe packet through a network tunnel to a destination computing system. The system receives from the destination computing system through the network tunnel an acknowledgment packet indicating receipt of the probe packet with the probe flag by the destination computing system. The system determines whether the transmitted probe packet and the received acknowledgment packet satisfy a packet loss condition. The system indicates packet loss based on the transmitted probe packet and the received acknowledgment packet satisfying the packet loss condition.

20 Claims, 5 Drawing Sheets

(56) References Cited

U.S. PATENT DOCUMENTS

2024/0259255 A1 *   8/2024   Hegde ................. H04L 41/0654

OTHER PUBLICATIONS

International Search Report and Written Opinion received for PCT Application No. PCT/US24/13551, May 14, 2024, 15 pages.

Zhou, et al., "IPV6 delay and loss performance evolution", International Journal of Communication Systems 21, Issue No. 6, Dec. 28, 2007, pp. 643-663.

International Preliminary Report on Patentability received for PCT Application No. PCT/US2024/13551, mailed on Aug. 14, 2025, 09 pages.

\* cited by examiner

100

300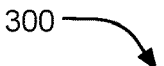

```
┌─────────────────────────────────────────────────────┐
│          Generate one or more probe packets           │
│                         302                           │
└─────────────────────────────────────────────────────┘
                          │
                          ▼
┌─────────────────────────────────────────────────────┐
│ Transmit the one or more probe packets through a       │
│ network tunnel to a destination computing system       │
│                         304                           │
└─────────────────────────────────────────────────────┘
                          │
                          ▼
┌─────────────────────────────────────────────────────┐
│ Receive one or more acknowledgement packets            │
│ indicating receipt of the one or more probe packet     │
│ with the probe flag by the destination computing       │
│ system                                                 │
│                         306                           │
└─────────────────────────────────────────────────────┘
                          │
                          ▼
```

Do the transmitted probe packets and the received acknowledgement packets satisfy a packet loss condition?
308

N

Y

Indicate packet loss
310

FIG.3

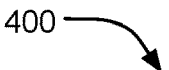
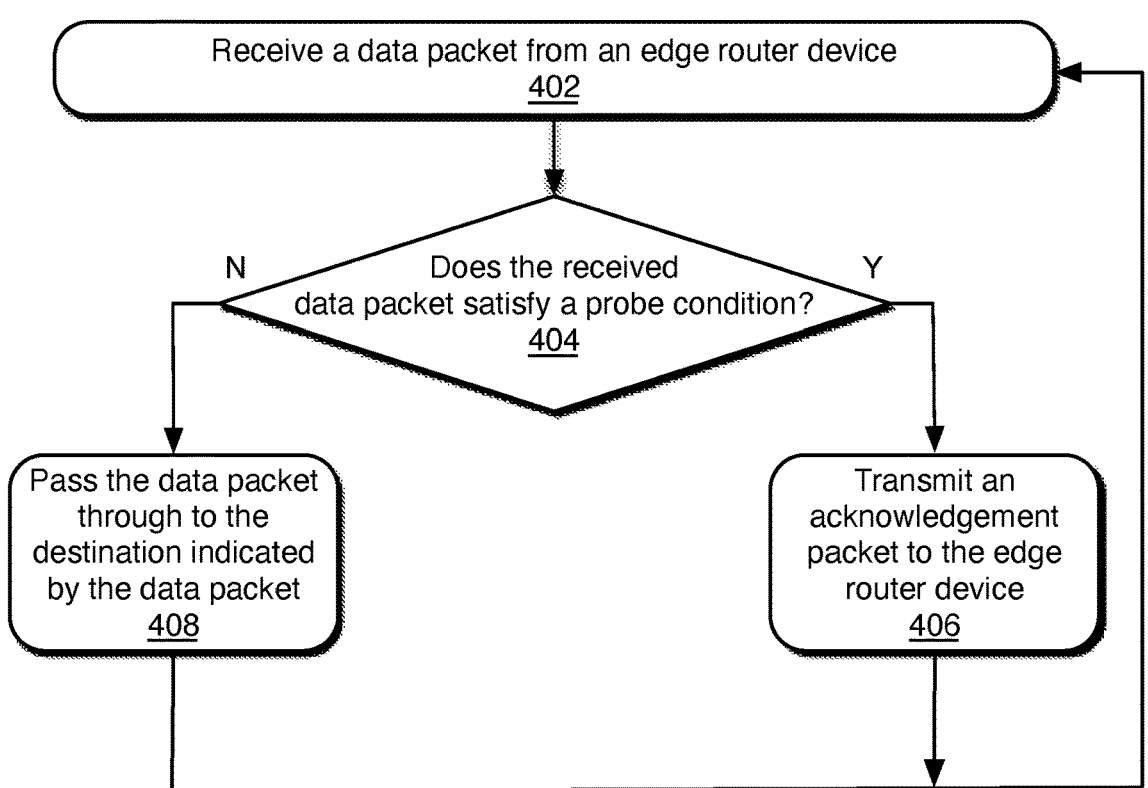
FIG.4

TUNNELED COMMUNICATION MONITORING

BACKGROUND

An overlay network abstracts an existing physical network (the "underlay network") as a virtual or logical network created on top of the physical network. The overlay network creates a new network layer in which data traffic can be programmatically directed through new virtual network routes or paths. In some implementations of an overlay network, the traffic is communicated through tunnels that traverse the underlay network.

Tunneling, also referred to as port forwarding in some implementations, is a protocol that allows the secure movement of data through a network or from one network to another. Tunneled communication involves enabling private network communications to be sent across a public network, such as the Internet, through a process called encapsulation. The encapsulation process allows data packets to appear as though they are of a public nature to a public network when they are actually private data packets, allowing them to pass through unnoticed.

In tunneling, the data is broken into smaller pieces called packets as they move along the tunnel. As the packets move through the tunnel, they are encrypted, and another process called encapsulation occurs. The private network data, and the protocol information that goes with it, are encapsulated within public network transmission units for transmission. The units look like public data, allowing them to be transmitted across the Internet. Encapsulation allows the packets to arrive at their proper destination. At the final destination, de-capsulation and decryption occur.

SUMMARY

In some aspects, the techniques described herein relate to a method of monitoring packet loss in tunneled communications, the method including: generating a probe packet including a probe flag; transmitting the probe packet through a network tunnel to a destination computing system; receiving, from the destination computing system through the network tunnel, an acknowledgment packet indicating receipt of the probe packet with the probe flag by the destination computing system; determining whether the transmitted probe packet and the received acknowledgment packet satisfy a packet loss condition; and indicating packet loss based on the transmitted probe packet and the received acknowledgment packet satisfying the packet loss condition.

In some aspects, the techniques described herein relate to a system for monitoring packet loss in tunneled communications, the system including: one or more hardware processors; a packet crafting agent executable by the one or more hardware processors and configured to generate a probe packet; a communication interface executable by the one or more hardware processors and configured to transmit the probe packet through a network tunnel to a destination computing system and to receive, from the destination computing system through the network tunnel, an acknowledgment packet indicating detection and receipt of the probe packet by the destination computing system; a packet loss monitor executable by the one or more hardware processors and configured to determine whether the transmitted probe packet and the received acknowledgment packet satisfy a packet loss condition; and an alert engine executable by the one or more hardware processors and configured to indicate packet loss based on the transmitted probe packet and the received acknowledgment packet satisfying the packet loss condition.

In some aspects, the techniques described herein relate to one or more tangible processor-readable storage media devices embodied with instructions for executing on one or more processors and circuits of a computing device a process for monitoring packet loss in tunneled communications, the process including: transmitting a probe packet through a network tunnel to a destination computing system, wherein the probe packet includes a probe flag; receiving, from the destination computing system through the network tunnel, an acknowledgment packet indicating receipt of the probe packet with the probe flag by the destination computing system; determining whether the transmitted probe packet and the received acknowledgment packet satisfy a packet loss condition; and indicating packet loss based on the transmitted probe packet and the received acknowledgment packet satisfying the packet loss condition.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 3 illustrates example operations for monitoring tunneled communications with an edge router device in an overlay network.

FIG. 4 illustrates example operations for supporting monitored tunneled communications at an end-point in an overlay network.

DETAILED DESCRIPTIONS

While overlay networks can provide an effective technology for scaling a virtual private network, it is a challenge to monitor traffic end-to-end within the overlay network because some potential monitoring solutions would involve putting monitoring information within the tunneling layers of customer traffic through to the end-point, such as a customer's virtual machine installation in a datacenter, introducing security concerns and potentially consuming small amounts of the bandwidth for which the customer is paying, etc. Yet packet loss in an overlay network can result in connectivity disruptions, high latency, and poor network throughput. As such, if tunneled data packets are lost during communications, the packet loss may remain undetected, at least until the customer complains about unsatisfactory network performance.

The described technology monitors end-to-end tunneled packet traffic within an overlay network by generating probe packets at a network end-point device, periodically transmitting such probe packets through the tunnel to the end-point where a Virtual Forwarding Platform (VFP) at the datacenter intercepts each probe packet (which does not include customer data), confirms the probe packet against a VFP policy, and acknowledges receipt of the probe packet to the network end-point device without forwarding the probe packet to the customer's virtual machine. Based on the number of probe packets transmitted and the number of acknowledgment packets received, the network end-point device can detect packet loss if the number of acknowledgment packets received is less than the number of probe packets transmitted. The described technology provides a technical benefit of detecting packet loss in tunneled communications of an overlay network without interfering with communications to the customer's end-point (e.g., the customer's virtual machine at a datacenter), thereby avoiding bandwidth consumption and security concerns.

Figure 1:
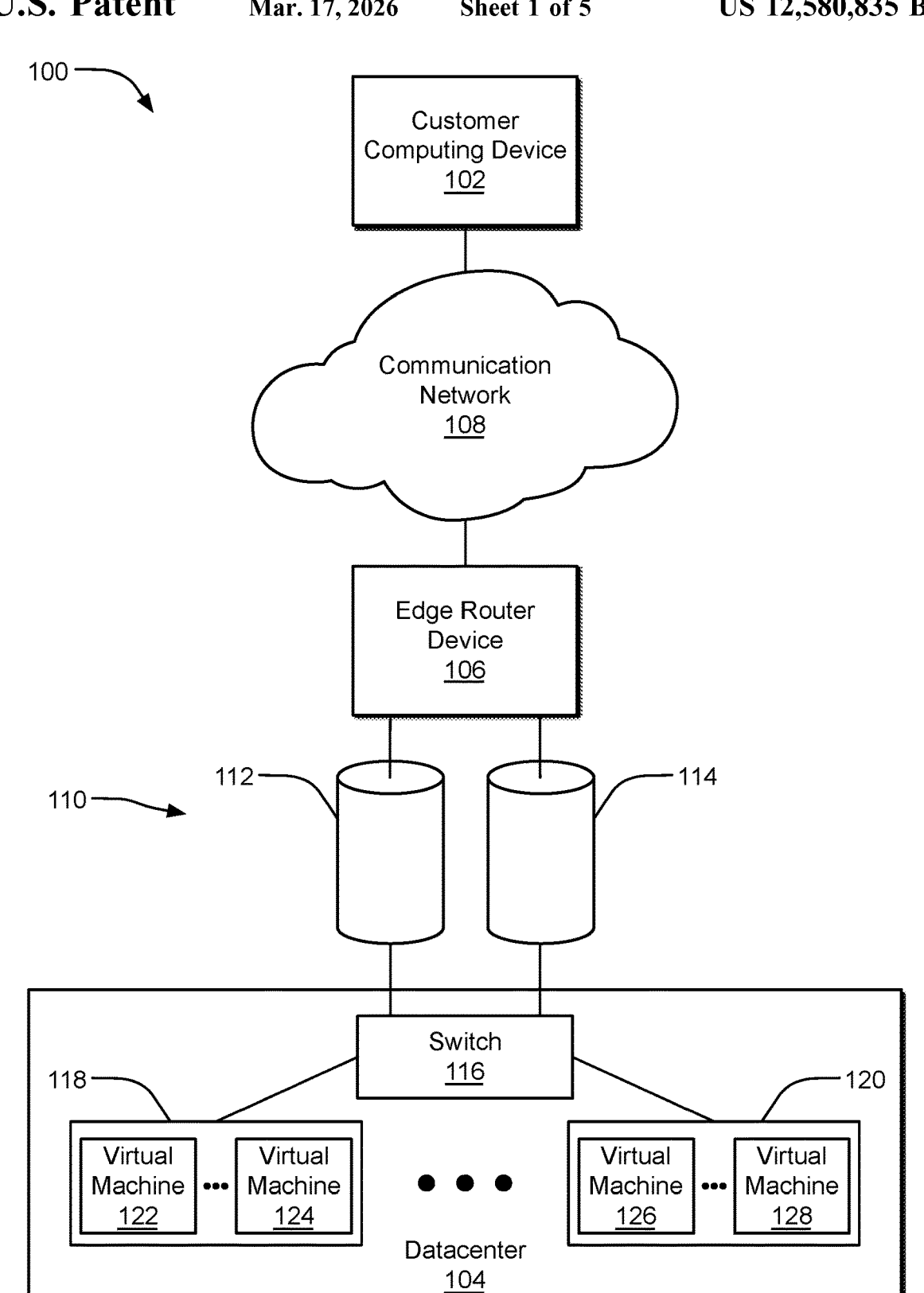
FIG. 1 illustrates an example overlay network with tunneled communications.

FIG. 1 illustrates an example overlay network 100 with tunneled communications. A customer uses a customer computing device 102 to access digital assets (e.g., stored data, cloud services) that reside at one or more datacenters (see, e.g., datacenter 104) on the overlay network 100. To access such assets, the customer computing device 102 communicates with an edge router device 106 through a communication network 108. The communication network 108 is typically a public network (e.g., via an internet connection), although the communication network 108 could be a private network (e.g., a secure/proprietary network of an enterprise).

In the illustrated implementation, the customer can securely connect his or her on-premise network to cloud-based data and services (e.g., in one or more datacenters) with low latency in communications (e.g., up to about 10 Gps in some implementations). A private route circuit represents a logical connection between the customer computing device 102 and cloud services through a connectivity provider. The private route circuit is identified and referenced by a unique identifier called a service key.

In some implementations, each private route circuit has a fixed bandwidth that is shared by various network peerings, which are connections between two separate networks. Each peering includes a pair of independent Border Gateway Protocol (BGP) sessions, each session being configured redundantly for high availability. Other implementations may vary. Examples of network peerings may include without limitation:

Private peering—connecting via a private connection the customer computing device to compute services (e.g., virtual machines, cloud services) deployed in the customer's virtual network Public peering—connecting via a public connection a customer's on-premise devices to SaaS (Software-as-a-Service) and PaaS (Platform-as-a-Service) services The edge router device 106 communicates customer data traffic between the customer computing device 102 and the datacenter 104. In some implementations, the data traffic over the (public) communication network 108 is encrypted between the customer computing device 102 and the edge router device 106.

In some implementations, the edge router device 106 and the datacenter 104 communicate over a private route circuit 110, including a primary connection 112 and a secondary connection 114 for redundancy. Data traffic through each connection is transported as tunneled communication.

The datacenter 104 includes a switch 116, which sends and receives data traffic via the private route circuit 110. The switch 116 selectively directs data traffic from the private route circuit 110 to destination server devices (e.g., a destination server 118 and a destination server 120). Each destination service device can execute one or more virtual machines (e.g., virtual machine 122, virtual machine 124, virtual machine 126, virtual machine 128), store customer data, and/or provide other software services). In reverse, the switch 116 receives data traffic from components of the datacenter 104 and transmits that data traffic to the edge router device 106 via the private route circuit 110.

As previously mentioned, systems like the one shown in FIG. 1 facilitate scaling but present challenges to monitoring, such as monitoring for data packet loss in the private route circuit 110. For example, physical components of the underlay network may fail, resulting in sent data packets not arriving at their specified destinations. Likewise, logical aspects of the overlay network may fail, such as a corrupted routing table within the private route circuit 110. Typically, other networking mechanisms automatically work to deliver the lost data packets to their specified destinations (e.g., re-trying and/or re-routing transmission), but such mechanisms degrade the designed performance of the private route circuit 110 and fail to timely detect packet loss and/or alert the vendor managing the private route circuit 110 of the packet loss. Often, the vendor may not be aware of any packet loss in the private route circuit 110 until a customer complains of poor network performance, and even then, finding and resolving the root cause of the packet loss can be difficult given the tunneled nature of the communications and concerns about security and customer bandwidth.

The described technology provides packet loss monitoring within the overlay network without compromising security or impinging customer bandwidth. In general, the edge router device 106 handles customer data traffic as described above.

In addition, the edge router device 106 also generates probe packets and transmits them to the end-points (e.g., the virtual machine 122). The probe packets are data packets that are instrumented with one or more probe flags that can be evaluated and intercepted by a virtual forwarding platform at the datacenter 104 before they are forwarded on to an end-point. In one implementation, a probe packet format designates a probe flag including a TCP option 250 and a predesignated signature payload, although other probe flags may be employed. The probe packet format is predesignated within the overlay network and is understood by and/or communicated to both the edge router device 106 and the various virtual forwarding platforms within the overlay network expected to intercept the probe packets. In this manner, a virtual forwarding platform can recognize a probe packet, distinguishing it from a standard data packet. For example, the TCP option 250 and the signature payload represent predesignated values of a probe flag, although other predesignated values may be coordinated between the edge router device 106 and the various virtual forwarding platforms. In some implementations, if a virtual forwarding platform recognizes a received packet as a probe packet, it intercepts the probe packet, does not forward the probe packet within the destination computing system, and responds with an acknowledgement packet that conforms with a predesignated format (e.g., a format that the edge router device recognizes as an acknowledgement packet corresponding to its probe packet). In one implementation, a predesignated format for an acknowledgement packet includes the TCP option 250 and the same signature payload, although other variations may be employed.

A virtual forwarding platform (VFP—not shown) receives the data traffic at the datacenter 104 and evaluates the TCP option and the predesignated signature payload of each data packet to confirm whether they satisfy a probe condition (e.g., include the TCP option 250 and the predesignated signature payload). If a data packet does not satisfy the probe condition, the data packet is passed to the end-point (e.g., the virtual machine 122). If a data packet satisfies the probe condition, the data packet is not passed to the end-point (e.g., the virtual machine 122), and the VFP sends a probe acknowledgment packet back to the edge router device 106. If the probe acknowledgment packets do not match the transmitted probe packets (e.g., the edge router device 106 receives fewer probe acknowledgment packets than the number of probe packets it sent), then the edge router device 106 detects this mismatch as evidencing packet loss and issues an alert (e.g., informing the vendor of the packet loss detection).

Figure 2:
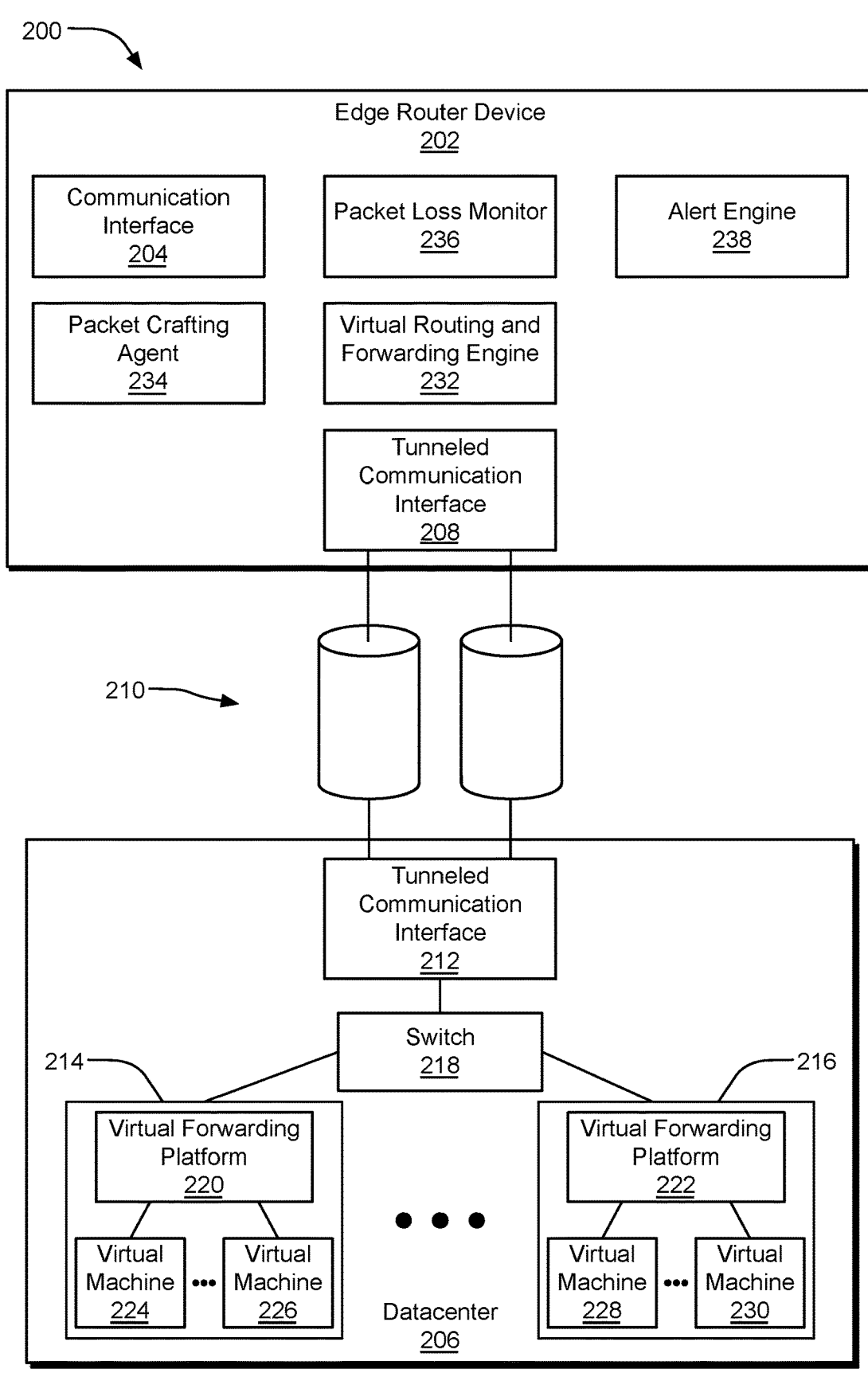
FIG. 2 illustrates two example elements in an overlay network with tunneled communications.

FIG. 2 illustrates two example elements in an overlay network 200 with tunneled communications. An edge router device 202 is configured to communicate data traffic with a customer computing device (not shown) via a communication interface 204. The edge router device 202 forwards customer data packets from the customer computing device to a datacenter 206 via a tunneled communication interface 208 and a private route circuit 210 and further receives customer data packets from the datacenter 206 via a tunneled communication interface 208 and the private route circuit 210 and forwards them to the customer computing device via the communication interface 204.

At the datacenter side of the communication channel, the datacenter 206 receives customer data packets from the edge router device 202 via the private route circuit 210 and a tunneled communication interface 212 and selectively directs the customer data packets to a destination server device (e.g., a destination server 214 and a destination server 216 via a switch 218. a virtual forwarding platform or VFP (see, e.g., a virtual forwarding platform 220 and a virtual forwarding platform 222) at each destination server device. If the VFP does not detect that a data packet is a probe packet (e.g., the data packet does not satisfy a probe condition), then the VFP of the destination server device forwards the data packet to the appropriate end-point (e.g., a virtual machine 224, a virtual machine 226, a virtual machine 228, or a virtual machine 230). Data traffic from the datacenter 206 that is destined for the customer computing device passes through the switch 218, the tunneled communication interface 212, the private route circuit 210, and the edge router device 202 in reverse.

During overlay network probing, the probe communication sequence is different than the customer data communication sequence. The edge router device 202, in response to a trigger (e.g., expiration of a time period, a vendor-initiated instruction, an event-driven instruction) of an overlay network probing, the edge router device 202 generates one or more probe packets, at least on most implementations, although the probe packets may be generated (e.g., crafted) in a separate computing device in some implementations.

In at least one implementation, the probe packets are instrumented with a probe indicator (e.g., a TCP option 250 and a predesignated signature payload) at the edge router device 202 and forwarded through the tunneled communication interface 208 over the private route circuit 210 by a virtual routing and forwarding engine 232 (a VRF). Each probe packet is generated by a packet crafting agent 234 to include the probe flag that is configured to be recognizable by VFPs at the destination. Other implementations may be configured differently, such as with different probe indicators and/or other components performing aspects of the communication. In at least one implementation, the edge router device 202 generates and forwards five probe packets to each destination it supports every fifteen minutes, although different probe packet counts and intervals (e.g., every minute) may be employed. Probe packets can be sent between different sources (e.g., edge routing devices) and destination IP addresses (e.g., indicating a destination end-point) to monitor packet loss within the overlay network.

When a probe packet is received by a VFP at the destination, the VFP knows the probe flag (e.g., the TCP option value and/or the predesignated signature payload) and evaluates the probe packet against a predesignated probe condition to identify it as a probe packet. A data packet that fails to satisfy the probe condition is forwarded to the end-point (e.g., a virtual machine). In contrast, a data packet that satisfies the probe condition is identified as a probe packet and is not forwarded to the end-point. Instead, the VFP generates a probe acknowledgment, which it transmits back to the edge router device 202. In this manner, the VFP passes customer data traffic to the end-point destination but intercepts probe packets and responds with a probe acknowledgment to the edge router device 202.

When the probe acknowledgments are received at the edge router device 202, a packet loss monitor 236 evaluates the transmitted probe packet and the received acknowledgment packet against a packet loss condition. In one implementation, the packet loss condition evaluates whether there is that the number of transmitted probe packets does not match (e.g., mismatches) the number of received acknowledgment packets, which indicates packet loss between the transmitted probe packets and the received acknowledgment packets. For example, if there is a mismatch, then the condition is not satisfied, and therefore packet loss is detected. If the transmitted probe packets and the received acknowledgment packets do not satisfy the packet loss condition, then the packet loss monitor 236, then no packet loss is detected.

Other packet loss conditions may be employed, including without limitation detecting a mismatch between individual probe packets and individual acknowledgment packets, receiving a summary of the acknowledgment packets received by the VFPs and comparing the summary information to the individual probe packets, and applying time windows for acceptable acknowledgments (e.g., to filter out long-delayed acknowledgments). In various implementations, such a mismatch may include a mismatch between predesignated values in the acknowledgement packet, a stale acknowledgement packet received outside of an predesignated time window, etc.

If the packet loss monitor 236 detects packet loss (e.g., because the transmitted probe packets and the received acknowledgment packets satisfy the packet loss condition), the packet loss monitor 236 signals an alert engine 238 to issue an alert to support resources (e.g., systems and/or personnel) as a notification of detected packet loss. The alert may include contextual information including without limitation the number of lost probe packets and/or acknowledgment packets and transmission/receipt times. The support resources can then troubleshoot the packet loss throughout the overlay network to resolve the problem. If the packet loss monitor 236 does not detect packet loss (e.g., because the transmitted probe packets and the received acknowledgment packets do not satisfy the packet loss condition), the packet loss monitor 236 need not issue an alert. However, in both cases, information about the transmitted probe packets and the received acknowledgment packets may be logged at the edge router device 202.

FIG. 3 illustrates example operations 300 for monitoring tunneled communications with an edge router device in an overlay network. In an implementation of monitoring packet loss in the tunneled communications, a generating operation 302 generates one or more probe packets. Each probe packet includes a probe flag, which can be recognized by VFPs at destination computing systems to distinguish it from customer data traffic and other data traffic.

In at least one implementation, the generating operation 302 crafts the probe packets as SYN (synchronize sequence number) packets with a TCP option set to a value of 250 and a predesignated signature payload. The predesignated signature payload can be any agreed-upon sequence or another data object that can be evaluated by each VFP. In one example, the generating operation 302 uses a low-level library to craft the probe packet by creating a raw socket stream, although other approaches may be employed. The VFP uses this TCP option and the predesignated signature payload to identify the SYN packets as probe packets and intercept them. The VFP will respond to the receipt of each probe packet by returning an ACK (acknowledgment) packet to the probe packet source (e.g., the edge router device), as described below with reference to FIG. 4.

In one example implementation, each layer of a (TCP) probe packet is generated individually into a byte stream, and the predesignated signature payload is converted into the byte stream. The listing below demonstrates the crafting of a probe packet using sockets in the example implementation, although other implementations may be employed.

| | |
|---|---|
| ethernet = b'\x2c\xdd \xe9\xbb\x01\xbb' | # MAC Address Destination |
| ethernet += b'x2c\xdd\xe9\xbb\x01 \xbb' | # MAC Address Source |
| ethernet += b'\x08\x00' | #Protocol-Type: IPV4 |
| ip_header=b'\x45\x00\x00\x3¢' | # Version, IHL, Service Type | Length |
| ip header += b'\xb2\x43\x40\x00' | # Identification | Flags, Fragment Offset |
| ip header += b'\x40\x06\xa2\xcc' | # TTL, Protocol | Header Checksum |
| ip_header += b'\xc0\xa8\x10\xfe' | # Source Address |
| ip_header += b'\x14\x01\x00\x05' | # Destination Address |
| tcp_header= b'\x04\x08\x0d\x3d' | # Source Port | Destination Port |
| tcp_header += b'\x00\x00\x00\x01' | # Sequence Number |
| tcp_header +=b'\x00\x00\x00\x00' | # Acknowledgment Number |
| tcp_header += b'\Id0\x02\x43\x80' | # Data Offset, Reserved, Flags | Size |
| tcp_header += b'\x73\x0e\x00\x00' | # Checksum | Urgent Pointer |
| tcp_header +=b'\xfa\x20\x27\x54' | # option 250 | payload |
| tcp_header += b'\x5c/x0e\xc3\x13' | # payload |
| tcp_header += b'\xb8\x3a\x00\x00' | # payload | padding |
| tcp header += b'x00\x00\x00\x00' | # Padding |
| tcp_header +=b'\x00\x00\x00\x00' | # Padding |
| tcp_header +=b'\00\x00\x00\x00' | # Padding |
| tcp_header+=b'\x00\x00\x00\x00' | # Padding |
| tcp header += b'\x00\x00\x00\x00' | # Padding |

An example probe packet is provided below, wherein the ethernet_header corresponds to the Ethernet layer, the ip_header corresponds to the IP layer, and the top header corresponds to the TCP layer, although other probe packet configurations may be employed:

ethernet_header = Ether(dst =

"2c:dd:e9:bb:01:bb", src = "2c:dd:e9:bb:01:bb", type = " | Pv4")

ip_header = IP(dst = "20.1.0.4", src = "192.168.16.254")

top_header =

TCP(sport = 1066, dport = 3389, flags = "S", options = [(250, "payload")])

8

A transmission operation 304 transmits (e.g., from the edge router device) the one or more probe packets through a network tunnel to the destination computing system. In at least one implementation, the VFP at the destination computing system intercepts the probe packet and acknowledges receipt of the probe packet back to the source (e.g., the edge router device) without passing the probe packet to an end-point at the destination computing system (e.g., preventing the probe packet from passing to end-point at the destination computing system). In other implementations, the VFP at the destination computing system can intercept the probe packet and acknowledge its receipt to the source but still pass the probe packet to an end-point at the destination computing system.

A receiving operation 306 receives one or more acknowledgment packets from the destination computing system through the network tunnel, each acknowledgment packet indicating receipt of a corresponding probe packet with the probe flag by the destination computing system. A packet loss operation 308 determines whether the transmitted probe packet and the received acknowledgment packet satisfy a packet loss condition, as previously discussed. An alert operation 310 indicates packet loss based on the transmitted probe packet and the received acknowledgment packet failing to satisfy the packet loss condition. Processing returns to the generating operation 302 to continue the monitoring.

In other implementations, the probe packets may be generated ahead of time and reused with each probing cycle. As such, processing can instead return to the transmission operation 304 to begin a new probing cycle.

FIG. 4 illustrates example operations 400 for supporting monitored tunneled communications at an end-point in an overlay network. A receiving operation 402 receives a data packet from a source (e.g., an edge router device), such as via a communication interface in the VFP.

A probe detection operation 404 determines whether the data packet satisfies a probe condition, such as via a probing filter in the VFP. For example, a VFP can evaluate the TCP option (e.g., with a 250 value) and the predesignated payload via a policy, such as the policy (e.g., a rule) shown below, along with counts arising from the policy:

RULE: INCOMING_MONITORING PING RESPONSE RULE

Friendly name: INCOMING_MONITORING_PING_RESPONSE_RULE

Priority: 50

Flags : 32769 terminating monitoring_ping_packet

Type: pingresponse

Conditions:

Source IP: 10.1.0.0/16,20.1.0.0/16, 168.63.129.16/32, 192.168.16.252/30

Flow TIL: 0

FlagsEx: 0

RULE COUNTER

Matched packets: 12236

Dropped packets: 12236

Pending packets: 0

Dropped unified flows: 0

A VFP trace showing details of the rule processed for a transmitted probe packet (received by the VFP) is shown below as an example:

[810004.0050: 2022–12–21 06:16:43.117[Microsoft–Windows–Hyper–*V*–*VfpExt*]23rule with *ID* INCOMING_MONITORING_PING_RESPONSE_RULE processed inbound packets on port 11 (Name = *DCD5616F–75B1–4471–8C6A–B072BEA3901B*,

*FriendlyName* = External_002248C3EF3E) with status =

3221225473: flow *ID* {*sc ip* = 192.168.16.254, *dstip* = 20.1.0.4,

*src* port = 20, *dst* port = 3389, protocol = 6, *isTcpSyn* = true), rule {layer = VP_DEFAULT_LAYER_STATEFULL, group = DEFAULT *IPv*4 GROUP IN, rule *id* = INCOMING MONITORING PING_RESPONSE_RULE, *aftFlags* = 0)

If the received data packet satisfies the probe condition, the data packet is identified as a probe packet in an acknowledgment operation 406, which generates and transmits an acknowledgment packet back to the edge router device, such as via the communication interface in the VFP. In one implementation, the data packet is not passed on to the destination indicated by the data packet by the acknowledgment operation 406, but in other implementations, the data packet may also be passed to the destination, such as via a routing interface in the VFP. If the received data packet does not satisfy the probe condition, the data packet is not identified as a probe packet, and a routing operation 408 communicates the data packet to the destination indicated by the data packet, such as via the routing interface in the VFP.

Figure 5:
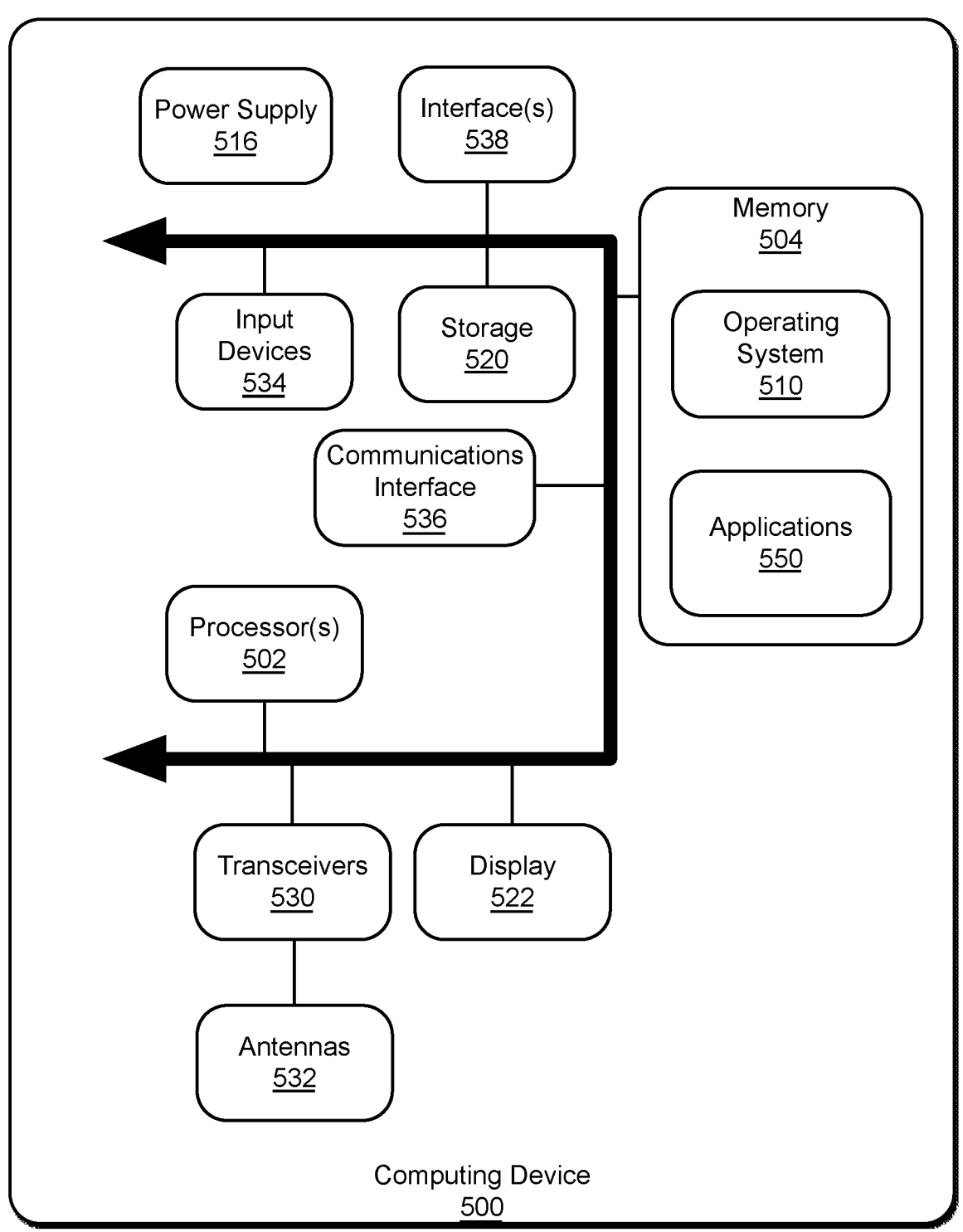
FIG. 5 illustrates an example computing device for implementing the features and operations of the described technology.

FIG. 5 illustrates an example computing device 500 for implementing the features and operations of the described technology. The computing device 500 may embody a remote-control device or a physically controlled device and is an example network-connected and/or network-capable device and may be a client device, such as a laptop, mobile device, desktop, tablet; a server/cloud device; an internet-of-things device; an electronic accessory; or another electronic device. The computing device 500 includes one or more processor(s) 502 and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550, communication interfaces, routing interfaces, probing filters, packet crafting agents, packet loss monitors, alert engines, virtual routing and forwarding engines, virtual forwarding platforms, switches, and other modules are loaded into the operating system 510 on the memory 504 and/or storage 520 and executed by processor(s) 502. The storage 520 may include one or more tangible storage media devices and may store predesignated signature payloads, probe packets, acknowledgment packets, and other data and can be local to the computing device 500 or remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (e.g., a network adapter), which is a type of computing device. The computing device 500 may use the communications interface 536 and any other types of computing devices for establishing connections over a wide-area network (WAN) or local-area network (LAN). It should be appreciated that the network connections shown are examples and that other computing devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

Clause 1. A method of monitoring packet loss in tunneled communications, the method comprising: generating a probe packet including a probe flag; transmitting the probe packet through a network tunnel to a destination computing system; receiving, from the destination computing system through the network tunnel, an acknowledgment packet indicating receipt of the probe packet with the probe flag by the destination computing system; determining whether the transmitted probe packet and the received acknowledgment packet satisfy a packet loss condition; and indicating packet loss based on the transmitted probe packet and the received acknowledgment packet satisfying the packet loss condition.

Clause 2. The method of clause 1, wherein the probe flag includes a predesignated value of a TCP option.

Clause 3. The method of clause 1, wherein the probe flag includes a predesignated signature payload.

Clause 4. The method of clause 1, wherein the probe flag is recognized by a virtual forwarding platform of the destination computing system.

Clause 5. The method of clause 1, wherein multiple probe packets are transmitted through the network tunnel to the destination computing system, and the packet loss condition evaluates whether there is a mismatch between a number of probe packets and a number of acknowledgment packets received.

Clause 6. The method of clause 1, wherein the packet loss condition evaluates whether there is a mismatch between the transmitted probe packet and the received acknowledgment packet.

Clause 7. The method of clause 1, wherein the transmitted probe packet is intercepted by a virtual forwarding platform of the destination computing network and prevented from passing to an end-point of the destination computing network.

Clause 8. A system for monitoring packet loss in tunneled communications, the system comprising: one or more hardware processors; a packet crafting agent executable by the one or more hardware processors and configured to generate a probe packet; a communication interface executable by the one or more hardware processors and configured to transmit the probe packet through a network tunnel to a destination computing system and to receive, from the destination computing system through the network tunnel, an acknowledgment packet indicating detection and receipt of the probe packet by the destination computing system; a packet loss monitor executable by the one or more hardware processors and configured to determine whether the transmitted probe packet and the received acknowledgment packet satisfy a packet loss condition; and an alert engine executable by the one or more hardware processors and configured to indicate packet loss based on the transmitted probe packet and the received acknowledgment packet satisfying the packet loss condition.

Clause 9. The system of clause 8, wherein the probe packet includes a probe flag including a predesignated value of a TCP option.

Clause 10. The system of clause 8, wherein the probe packet includes a probe flag including a probe flag includes a predesignated signature payload.

Clause 11. The system of clause 8, wherein the probe packet includes a probe flag including a probe flag recognized by a virtual forwarding platform of the destination computing system.

Clause 12. The system of clause 8, wherein multiple probe packets are transmitted through the network tunnel to the destination computing system, and the packet loss condition evaluates whether there is a mismatch between a number of probe packets and a number of acknowledgment packets received.

Clause 13. The system of clause 8, wherein the packet loss condition evaluates whether there is a mismatch between the transmitted probe packet and the received acknowledgment packet.

Clause 14. The system of clause 8, wherein the transmitted probe packet is intercepted by a virtual forwarding platform of the destination computing network and prevented from passing to an end-point of the destination computing network.

Clause 15. One or more tangible processor-readable storage media devices embodied with instructions for executing on one or more processors and circuits of a computing device a process for monitoring packet loss in tunneled communications, the process comprising: transmitting a probe packet from the computing device through a network tunnel to a destination computing system, wherein the probe packet includes a probe flag recognizable by the destination computing system; receiving, from the destination computing system through the network tunnel, an acknowledgment packet indicating receipt of the probe packet with the probe flag by the destination computing system, wherein the destination computing system recognized the probe flag, intercepted the probe packet without forwarding the probe packet within the destination computing system, and returned the acknowledgement packet to the computing device; determining whether the transmitted probe packet and the received acknowledgment packet satisfy a packet loss condition; and indicating packet loss based on the transmitted probe packet and the received acknowledgment packet satisfying the packet loss condition.

Clause 16. The one or more tangible processor-readable storage media devices of clause 15, wherein the probe flag includes a predesignated value of a TCP option.

Clause 17. The one or more tangible processor-readable storage media devices of clause 15, wherein the probe flag includes a predesignated signature payload.

Clause 18. The one or more tangible processor-readable storage media devices of clause 15, wherein multiple probe packets are transmitted through the network tunnel to the destination computing system, and the packet loss condition evaluates whether there is a mismatch between a number of probe packets and a number of acknowledgment packets received.

Clause 19. The one or more tangible processor-readable storage media devices of clause 15, wherein the packet loss condition evaluates whether there is a mismatch between the transmitted probe packet and the received acknowledgment packet.

Clause 20. The one or more tangible processor-readable storage media devices of clause 15, wherein the transmitted probe packet is intercepted by a virtual forwarding platform of the destination computing network and prevented from passing to an end-point of the destination computing network.

Clause 21. A system for monitoring packet loss in tunneled communications, the method comprising: means for generating a probe packet including a probe flag; means for transmitting the probe packet through a network tunnel to a destination computing system; receiving, from the destination computing system through the network tunnel, an acknowledgment packet indicating receipt of the probe packet with the probe flag by the destination computing system; means for determining whether the transmitted probe packet and the received acknowledgment packet satisfy a packet loss condition; and means for indicating packet loss based on the transmitted probe packet and the received acknowledgment packet satisfying the packet loss condition.

Clause 22. The system of clause 21, wherein the probe flag includes a predesignated value of a TCP option.

Clause 23. The system of clause 21, wherein the probe flag includes a predesignated signature payload.

Clause 24. The system of clause 21, wherein the probe flag is recognized by a virtual forwarding platform of the destination computing system.

Clause 25. The system of clause 21, wherein multiple probe packets are transmitted through the network tunnel to the destination computing system, and the packet loss condition evaluates whether there is a mismatch between a number of probe packets and a number of acknowledgment packets received.

Clause 26. The system of clause 21, wherein the packet loss condition evaluates whether there is a mismatch between the transmitted probe packet and the received acknowledgment packet.

Clause 27. The system of clause 21, wherein the transmitted probe packet is intercepted by a virtual forwarding platform of the destination computing network and prevented from passing to an end-point of the destination computing network.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method of monitoring packet loss in tunneled communications between a computing device and a destination computing system including a forwarding platform, the method comprising:

generating, by the computing device, a probe packet including a probe flag;

transmitting the probe packet through a network tunnel from the computing device to the destination computing system, wherein the probe packet instructs the forwarding platform of the destination computing system to intercept the probe packet without forwarding the probe packet within the destination computing system and to return an acknowledgement packet to the computing device;

receiving, by the computing device from the destination computing system through the network tunnel, an acknowledgment packet indicating receipt of the probe packet with the probe flag by the destination computing system; and determining, by the computing device, whether the probe packet and the acknowledgment packet satisfy a packet loss condition based on the probe packet and the acknowledgment packet satisfying the packet loss condition.

2. The method of claim 1, wherein the probe flag includes a predesignated value of a TCP option.

3. The method of claim 1, wherein the probe flag includes a predesignated signature payload and the acknowledgment packet includes the predesignated signature payload.

4. The method of claim 1, wherein the probe flag is recognizable by the forwarding platform of the destination computing system.

5. The method of claim 1, wherein multiple probe packets are transmitted through the network tunnel to the destination computing system, and the packet loss condition evaluates whether there is a mismatch between a number of probe packets and a number of acknowledgment packets received.

6. The method of claim 1, wherein the packet loss condition evaluates whether there is a mismatch between the probe packet and the acknowledgment packet.

7. The method of claim 1, wherein the probe flag of the probe packet instructs the forwarding platform of the destination computing system to intercept the probe packet and to prevent the probe packet from passing to an end-point of the destination computing system.

8. A system for monitoring packet loss in tunneled communications between a computing device and a destination computing system including a forwarding platform, the system comprising:

one or more hardware processors;

a packet crafting agent of the computing device executable by the one or more hardware processors and configured to generate a probe packet, wherein the probe packet instructs the forwarding platform of the destination computing system to intercept the probe packet without forwarding the probe packet within the destination computing system and to return an acknowledgement packet to the computing device;

a communication interface of the computing device executable by the one or more hardware processors and configured to transmit the probe packet from the computing device through a network tunnel to the destination computing system and to receive, from the destination computing system through the network tunnel, an acknowledgment packet indicating detection and receipt of the probe packet by the destination computing system; and a packet loss monitor of the computing device executable by the one or more hardware processors and configured to determine whether the probe packet and the acknowledgment packet satisfy a packet loss condition based on the probe packet and the acknowledgment packet satisfying the packet loss condition.

9. The system of claim 8, wherein the probe packet includes a probe flag including a predesignated value of a TCP option.

10. The system of claim 8, wherein the probe packet includes a probe flag including a probe flag includes a predesignated signature payload and the acknowledgment packet includes the predesignated signature payload.

11. The system of claim 8, wherein the probe packet includes a probe flag including a probe flag recognizable by the forwarding platform of the destination computing system.

12. The system of claim 8, wherein multiple probe packets are transmitted through the network tunnel to the destination computing system, and the packet loss condition evaluates whether there is a mismatch between a number of probe packets and a number of acknowledgment packets received.

13. The system of claim 8, wherein the packet loss condition evaluates whether there is a mismatch between the probe packet and the acknowledgment packet.

14. The system of claim 8, wherein a probe flag of the probe packet instructs the forwarding platform of the destination computing system to intercept the probe packet and to prevent the probe packet from passing to an end-point of the destination computing system.

15. One or more tangible processor-readable storage media devices embodied with instructions for executing on one or more processors and circuits of a computing device a process for monitoring packet loss in tunneled communications between a computing device and a destination computing system including a forwarding platform, the process comprising:

transmitting a probe packet from the computing device through a network tunnel to the destination computing system, wherein the probe packet includes a probe flag recognizable by the destination computing system and the probe packet instructs the forwarding platform of the destination computing system to intercept the probe packet without forwarding the probe packet within the destination computing system and to return an acknowledgement packet to the computing device;

receiving, by the computing device from the destination computing system through the network tunnel, an acknowledgment packet indicating receipt of the probe packet with the probe flag by the destination computing system; and determining, by the computing device, whether the probe packet and the acknowledgment packet satisfy a packet loss condition based on the probe packet and the acknowledgment packet satisfying the packet loss condition.

16. The one or more tangible processor-readable storage media devices of claim 15, wherein the probe flag includes a predesignated value of a TCP option.

17. The one or more tangible processor-readable storage media devices of claim 15, wherein the probe flag includes a predesignated signature payload and the acknowledgment packet includes the predesignated signature payload.

18. The one or more tangible processor-readable storage media devices of claim 15, wherein multiple probe packets are transmitted and multiple acknowledgment packets are received through the network tunnel to the destination computing system, and the packet loss condition evaluates whether there is a mismatch between a number of probe packets and a number of acknowledgment packets received.

19. The one or more tangible processor-readable storage media devices of claim 15, wherein the packet loss condition evaluates whether there is a mismatch between the probe packet and the acknowledgment packet.

20. The one or more tangible processor-readable storage media devices of claim 15, wherein the probe flag of the probe packet instructs the is intercepted by a forwarding platform of the destination computing system to intercept the probe packet and to prevent the probe packet from passing to an end-point of the destination computing system.

\* \* \* \* \*